Nov. 10, 1936. L. M. VALBUENA 2,060,478
ARTIFICIAL TOOTH
Filed April 15, 1933

INVENTOR.
Luis M. Valbuena
BY
his ATTORNEY.

Patented Nov. 10, 1936

2,060,478

UNITED STATES PATENT OFFICE 2,060,478

ARTIFICIAL TOOTH

Luis M. Valbuena, New York, N. Y.

Application April 15, 1933, Serial No. 666,229

1 Claim. (Cl. 32—8)

My present invention relates to improvements in artificial teeth for use in dental plates. The particular subject matter forming the basis of the invented disclosure concerns the structure of molar teeth which are adapted to contain therein a contractible valvular element to control passage of air to the suction chamber of a dental plate in which the tooth is secured. The type of dental plate utilizing this principle of operation, and in which a tooth made in accordance with the present invention is particularly adaptable, is shown and described in Letters Patent, Number 1,887,970, dated November 15th, 1932.

The object of the invention is to construct a tooth of this character that may be readily secured to the dental plate, and in which a chamber for the retention of the valvular element is already provided. A further object is, also, to construct the tooth in such a fashion that the retention of a valvular element is assured.

With the above objects in view, the invention resides in the novel formation and arrangement of parts comprising the tooth, the preferred embodiment of which is illustrated in the accompanying drawing. With reference thereto, Fig. 1 is a perspective view of a portion of the tooth constructed in accordance with the invention.

Figure 1:
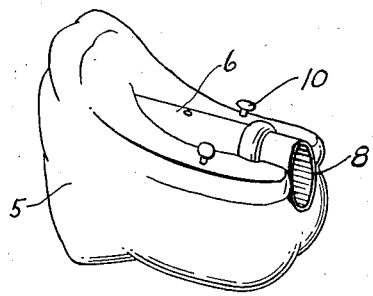
Figure 2:
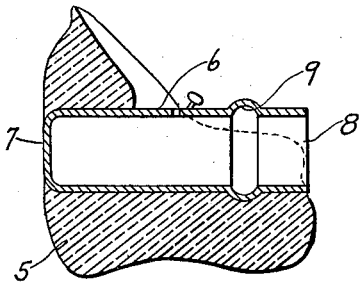
Fig. 2 is a longitudinal cross section of the tooth shown in Fig. 1.

The type of artificial tooth indicated at 5, Figs. 1 and 2 of the drawing, is constructed of porcelain. The tooth includes, therein, a tube 6, which is preferably of a metallic material, which may be readily punctured. This tube is placed in a position in the mold for the tooth before the porcelain is poured, so that it is integrally secured or imbedded therein after the porcelain becomes cold, and the tooth is removed from the mold. In the present instance, the tube extends the entire width of the tooth and does not protrude beyond its exterior surface. One end of this tubular element 6 is closed as indicated at 7. The other end 8 is left open to afford access to the interior of the tube, and in which the valvular element is placed, as taught in the disclosure of the Letters Patent, hereinbefore referred to. The interior of the tube is provided with a circumferential groove 9, in which a corresponding part of the valvular element, when in position, is adapted to fit, and to thereby be retained in its proper place within the tube. Holding members such as indicated at 10 are utilized in securing the tooth in position in the dental plate. The open end of the tube is situated at the tooth surface. The tube forms a valve casing within the tooth and provides a means through the medium of the circumferential groove for retaining the valvular element in position therein.

Figure 3:
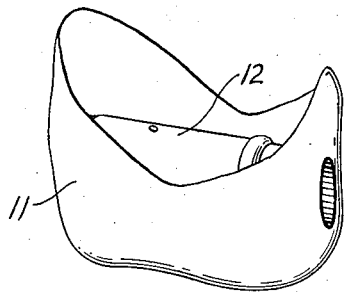
Fig. 3 is a perspective view of an artificial tooth in the form of a shell crown in which the present inventive conception is embodied.
Figure 4:
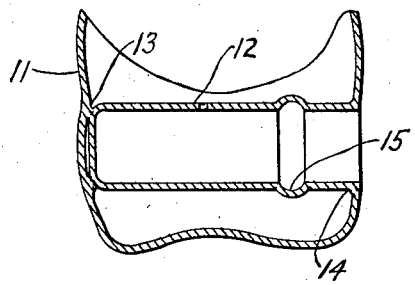
Fig. 4 is a longitudinal cross section of the tooth illustrated in Fig. 3.

With reference to Figs. 3 and 4, an artifiicial tooth, in the form of a shell crown, is indicated at 11. The tubular member, in this instance, is shown at 12, the closed end of the same being secured to the interior wall of the shell by soldering or otherwise, as indicated at 13. The open end of the tube is also firmly secured in the same manner at the opposite side of the shell, as shown at 14. In this form of the invention, the internal circumferential groove in the tube is indicated at 15. It will be understood that the inventive concepts, herein disclosed, include all modifications in form that may be contained within the scope of the appended claim.

I claim as my invention:

An artificial tooth having a metallic tube passing horizontally therethrough, said tube being closed at one end and open at the other, to form a valve receiving element, the open end of the tube being situated at the surface of the tooth, and an internal circumferential groove situated in the tube to permit removable retention of a valvular element therein.

LUIS M. VALBUENA.